US008832349B2

(12) United States Patent
Numata et al.

(10) Patent No.: US 8,832,349 B2
(45) Date of Patent: Sep. 9, 2014

(54) SERVER SYSTEM AND DYNAMIC MAINTENANCE METHOD FOR CROSSBAR BOARD

(71) Applicant: Fujitsu Limited, Kawasaki (JP)

(72) Inventors: Michio Numata, Kawasaki (JP); Yasuhiro Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/032,788

(22) Filed: Sep. 20, 2013

(65) Prior Publication Data

US 2014/0025862 A1    Jan. 23, 2014

Related U.S. Application Data

(63) Continuation of application No. PCT/JP2011/056847, filed on Mar. 22, 2011.

(51) Int. Cl.
*G06F 13/00* (2006.01)
*G06F 13/40* (2006.01)
*H04L 12/56* (2006.01)
*G06F 15/177* (2006.01)

(52) U.S. Cl.
CPC ........ *G06F 13/4004* (2013.01); *G06F 13/4022* (2013.01); *H04L 49/101* (2013.01); *G06F 15/177* (2013.01)
USPC ........................................................ 710/317

(58) Field of Classification Search
CPC .......................... G06F 13/4022; H04L 49/101
USPC ........................................................ 710/317
See application file for complete search history.

(56) References Cited

U.S. PATENT DOCUMENTS

| 5,388,262 | A | 2/1995 | Hillis |
| 2006/0023625 | A1 | 2/2006 | Ikawa |
| 2013/0086331 | A1* | 4/2013 | Konno et al. ................. 711/146 |

FOREIGN PATENT DOCUMENTS

| JP | 4-505675 | 10/1992 |
| JP | 2004-72547 | 3/2004 |
| JP | 2006-39897 | 2/2006 |
| JP | 2010-186302 | 8/2010 |
| WO | WO 2012-127629 A1 | 9/2012 |

OTHER PUBLICATIONS

PCT/ISA/237 Written Opinion of the International Searching Authority (& English translation) dated Jun. 16, 2011 in corresponding PCT/JP2011/056847 (8 pages).
International Search Report mailed Jun. 28, 2011 in corresponding International Application No. PCT/JP2011/056847.

* cited by examiner

*Primary Examiner* — Glenn A Auve
(74) *Attorney, Agent, or Firm* — Staas & Halsey LLP

(57) ABSTRACT

According to an aspect of an embodiment, a server system includes a service processor, a plurality of system boards and a plurality of crossbar boards connecting the system boards. The service processor includes a first notifier that notifies each of the crossbar boards of a crossbar board subjected to maintenance. The crossbar boards each include a first transmitter that, when notified by the service processor that the crossbar board subjected to maintenance is another crossbar board, generates a suspension packet for suspending packet transmission to the another crossbar board and transmits the suspension packet to each of the system boards. The system boards each include a suspender that, when receiving the suspension packet from the crossbar board, suspends packet transmission to the crossbar board subjected to maintenance.

8 Claims, 15 Drawing Sheets

FIG.5A

| DESTINATION | TRANSMISSION PATH | CHANGE |
|---|---|---|
| SYSTEM BOARD 3, CPU | SYSTEM BOARD 3 | 0 |
| SYSTEM BOARD 3, MEMORY | SYSTEM BOARD 3 | 0 |
| SYSTEM BOARD 4, CPU | CROSSBAR BOARD 7 | 0 |
| SYSTEM BOARD 4, MEMORY | CROSSBAR BOARD 8 | 0 |
| SYSTEM BOARD 5, CPU | CROSSBAR BOARD 7 | 0 |
| SYSTEM BOARD 5, MEMORY | CROSSBAR BOARD 8 | 0 |
| SYSTEM BOARD 6, CPU | CROSSBAR BOARD 7 | 0 |
| SYSTEM BOARD 6, MEMORY | CROSSBAR BOARD 8 | 0 |

FIG.5B

| DESTINATION | TRANSMISSION PATH | CHANGE |
|---|---|---|
| SYSTEM BOARD 3, CPU | SYSTEM BOARD 3 | 0 |
| SYSTEM BOARD 3, MEMORY | SYSTEM BOARD 3 | 0 |
| SYSTEM BOARD 4, CPU | CROSSBAR BOARD 7 | 0 |
| SYSTEM BOARD 4, MEMORY | CROSSBAR BOARD 7 | 1 |
| SYSTEM BOARD 5, CPU | CROSSBAR BOARD 7 | 0 |
| SYSTEM BOARD 5, MEMORY | CROSSBAR BOARD 7 | 1 |
| SYSTEM BOARD 6, CPU | CROSSBAR BOARD 7 | 0 |
| SYSTEM BOARD 6, MEMORY | CROSSBAR BOARD 7 | 1 |

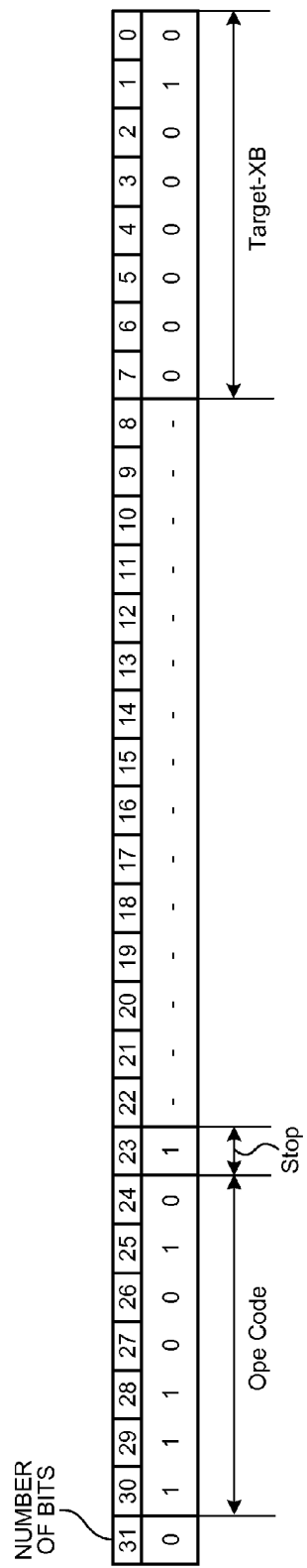

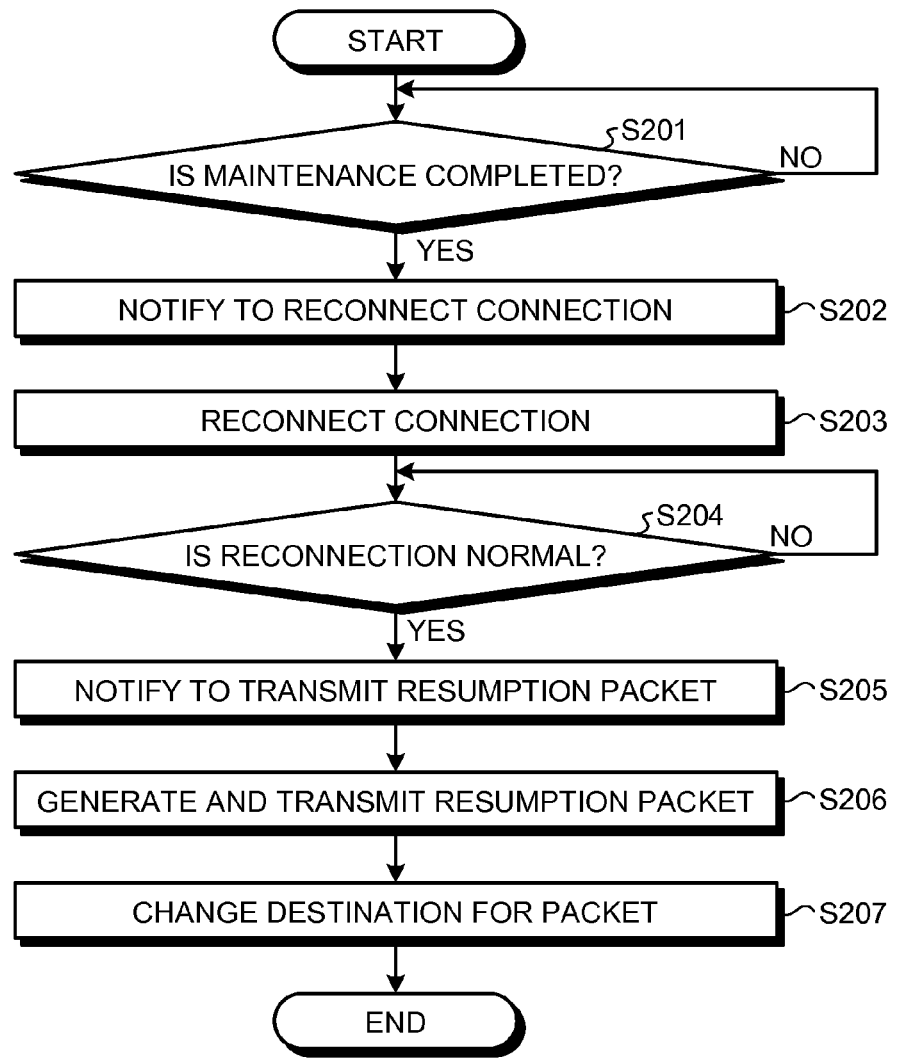

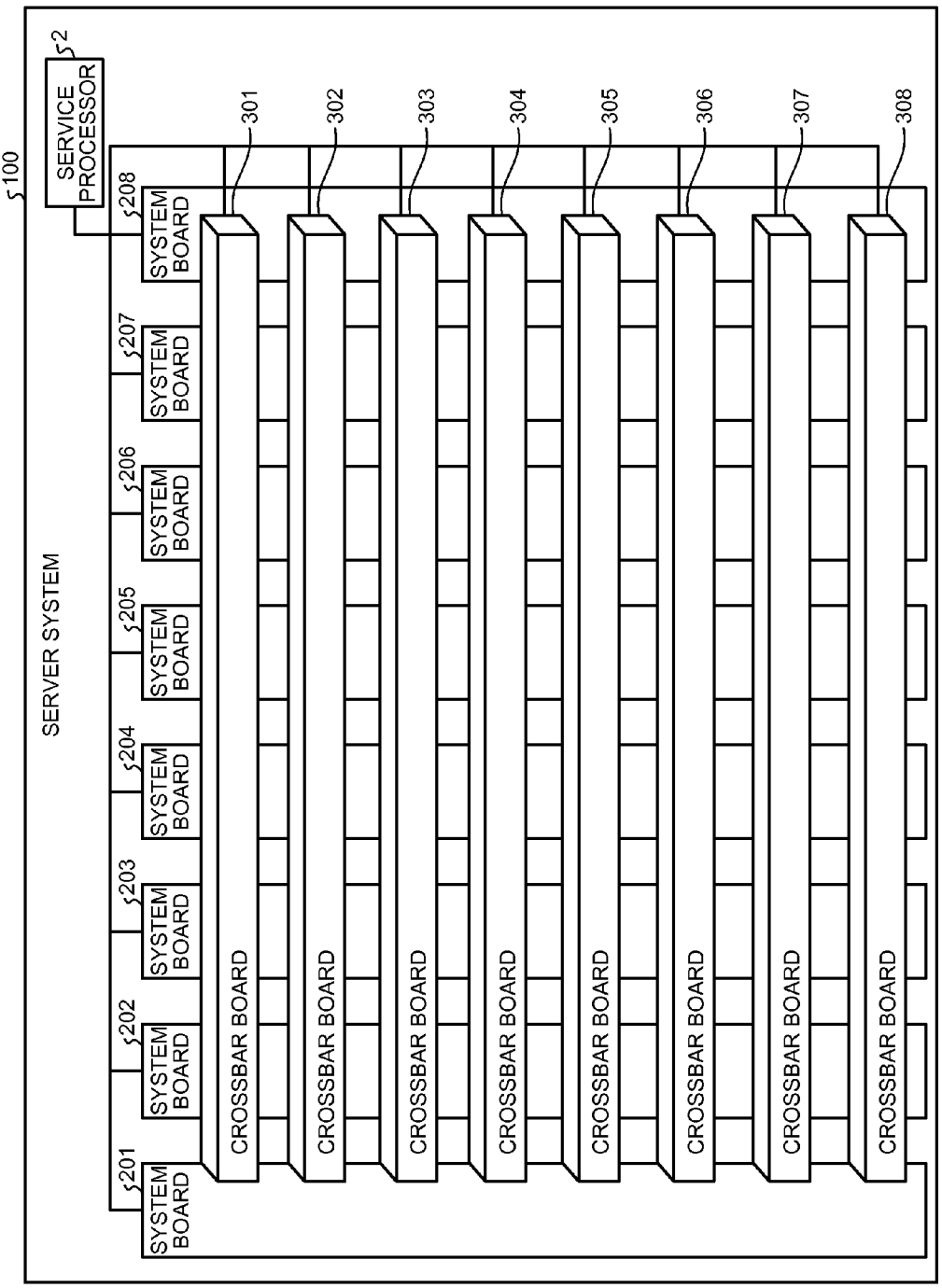

FIG.11A

| DESTINATION | TRANSMISSION PATH | CHANGE |
|---|---|---|
| SYSTEM BOARD 201, CPU#1 | SYSTEM BOARD 201 | 0 |
| SYSTEM BOARD 201, CPU#2 | SYSTEM BOARD 201 | 0 |
| SYSTEM BOARD 201, CPU#3 | SYSTEM BOARD 201 | 0 |
| SYSTEM BOARD 201, CPU#4 | SYSTEM BOARD 201 | 0 |
| SYSTEM BOARD 201, MEMORY GROUP#1 | SYSTEM BOARD 201 | 0 |
| SYSTEM BOARD 201, MEMORY GROUP#2 | SYSTEM BOARD 201 | 0 |
| SYSTEM BOARD 201, MEMORY GROUP#3 | SYSTEM BOARD 201 | 0 |
| SYSTEM BOARD 201, MEMORY GROUP#4 | SYSTEM BOARD 201 | 0 |
| SYSTEM BOARD 202, CPU#1 | CROSSBAR BOARD 301 | 0 |
| SYSTEM BOARD 202, CPU#2 | CROSSBAR BOARD 303 | 0 |
| SYSTEM BOARD 202, CPU#3 | CROSSBAR BOARD 305 | 0 |
| SYSTEM BOARD 202, CPU#4 | CROSSBAR BOARD 307 | 0 |
| SYSTEM BOARD 202, MEMORY GROUP#1 | CROSSBAR BOARD 302 | 0 |
| SYSTEM BOARD 202, MEMORY GROUP#2 | CROSSBAR BOARD 304 | 0 |
| SYSTEM BOARD 202, MEMORY GROUP#3 | CROSSBAR BOARD 306 | 0 |
| SYSTEM BOARD 202, MEMORY GROUP#4 | CROSSBAR BOARD 308 | 0 |
| ... | ... | ... |
| SYSTEM BOARD 208, CPU#1 | CROSSBAR BOARD 301 | 0 |
| SYSTEM BOARD 208, CPU#2 | CROSSBAR BOARD 303 | 0 |
| SYSTEM BOARD 208, CPU#3 | CROSSBAR BOARD 305 | 0 |
| SYSTEM BOARD 208, CPU#4 | CROSSBAR BOARD 307 | 0 |
| SYSTEM BOARD 208, MEMORY GROUP#1 | CROSSBAR BOARD 302 | 0 |
| SYSTEM BOARD 208, MEMORY GROUP#2 | CROSSBAR BOARD 304 | 0 |
| SYSTEM BOARD 208, MEMORY GROUP#3 | CROSSBAR BOARD 306 | 0 |
| SYSTEM BOARD 208, MEMORY GROUP#4 | CROSSBAR BOARD 308 | 0 |

FIG.11B

| DESTINATION | TRANSMISSION PATH | CHANGE |
|---|---|---|
| SYSTEM BOARD 201, CPU#1 | SYSTEM BOARD 201 | 0 |
| SYSTEM BOARD 201, CPU#2 | SYSTEM BOARD 201 | 0 |
| SYSTEM BOARD 201, CPU#3 | SYSTEM BOARD 201 | 0 |
| SYSTEM BOARD 201, CPU#4 | SYSTEM BOARD 201 | 0 |
| SYSTEM BOARD 201, MEMORY GROUP#1 | SYSTEM BOARD 201 | 0 |
| SYSTEM BOARD 201, MEMORY GROUP#2 | SYSTEM BOARD 201 | 0 |
| SYSTEM BOARD 201, MEMORY GROUP#3 | SYSTEM BOARD 201 | 0 |
| SYSTEM BOARD 201, MEMORY GROUP#4 | SYSTEM BOARD 201 | 0 |
| SYSTEM BOARD 202, CPU#1 | CROSSBAR BOARD 302 | 1 |
| SYSTEM BOARD 202, CPU#2 | CROSSBAR BOARD 303 | 0 |
| SYSTEM BOARD 202, CPU#3 | CROSSBAR BOARD 305 | 0 |
| SYSTEM BOARD 202, CPU#4 | CROSSBAR BOARD 307 | 0 |
| SYSTEM BOARD 202, MEMORY GROUP#1 | CROSSBAR BOARD 302 | 0 |
| SYSTEM BOARD 202, MEMORY GROUP#2 | CROSSBAR BOARD 304 | 0 |
| SYSTEM BOARD 202, MEMORY GROUP#3 | CROSSBAR BOARD 306 | 0 |
| SYSTEM BOARD 202, MEMORY GROUP#4 | CROSSBAR BOARD 308 | 0 |
| ... | ... | ... |
| SYSTEM BOARD 208, CPU#1 | CROSSBAR BOARD 308 | 1 |
| SYSTEM BOARD 208, CPU#2 | CROSSBAR BOARD 303 | 0 |
| SYSTEM BOARD 208, CPU#3 | CROSSBAR BOARD 305 | 0 |
| SYSTEM BOARD 208, CPU#4 | CROSSBAR BOARD 307 | 0 |
| SYSTEM BOARD 208, MEMORY GROUP#1 | CROSSBAR BOARD 302 | 0 |
| SYSTEM BOARD 208, MEMORY GROUP#2 | CROSSBAR BOARD 304 | 0 |
| SYSTEM BOARD 208, MEMORY GROUP#3 | CROSSBAR BOARD 306 | 0 |
| SYSTEM BOARD 208, MEMORY GROUP#4 | CROSSBAR BOARD 308 | 0 |

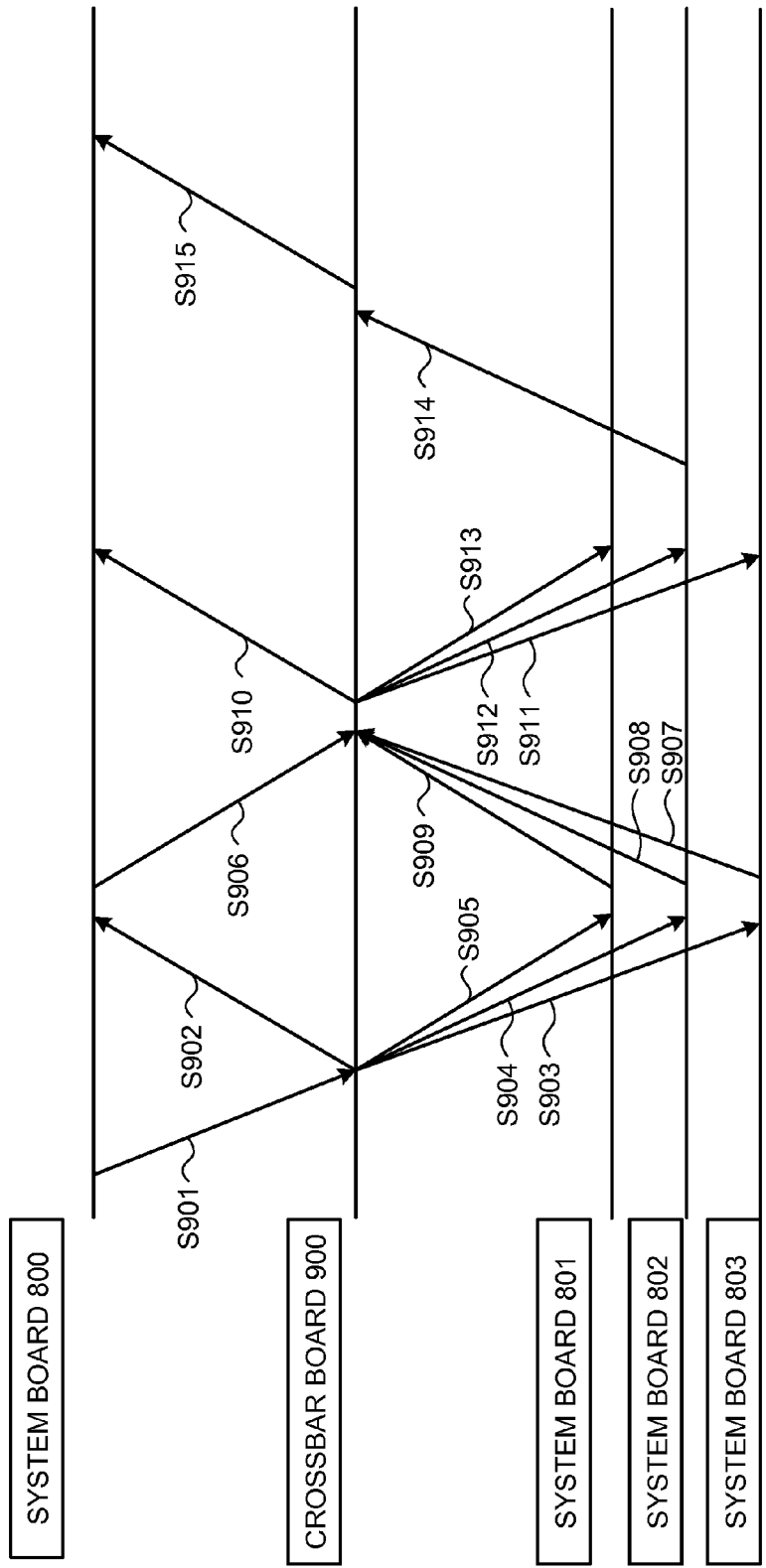

SERVER SYSTEM AND DYNAMIC MAINTENANCE METHOD FOR CROSSBAR BOARD

CROSS-REFERENCE TO RELATED APPLICATION(S)

This application is a continuation of International Application No. PCT/JP2011/056847, filed on Mar. 22, 2011, the entire contents of which are incorporated herein by reference.

FIELD

The embodiments discussed herein are related to server systems and dynamic maintenance methods for crossbar boards.

BACKGROUND

A server system has conventionally been formed to include a plurality of system boards, each including a central processing unit (CPU) resource, and crossbar boards. At the system board, the CPU performs various types of calculation processes. Results of calculations performed within each system board, data retained by each system board, and the like are transferred to other system boards via the crossbar board. The server system exemplified in FIG. 12 will be described below.

FIG. 12 is a diagram illustrating a configuration of a server system according to a related art. This server system 700 illustrated in FIG. 12 includes system boards 800, 801, 802, 803 and crossbar boards 900, 901. For example, the system board 802, if requested for data by the system board 800, transfers the requested data to the system board 800 via the crossbar board 900.

A data transfer process performed in the server system will be described below with reference to FIG. 13. FIG. 13 illustrates steps of the data transfer process performed among the system boards. As illustrated in FIG. 13, the system board 800 transmits to the crossbar board 900 a packet for inquiring about an address of the data to be requested (S901). The crossbar board 900 then transfers the received packet to all of the system boards 800 to 803 (S902 to S905).

Next, the crossbar board 900 receives response packets having cache states of the respective system boards snooped (S906 to S909) and transfers the received response packets to all of the system boards (S910 to S913). This results in the system boards 800 to 803 having acquired the address of the data requested by the system board 800. Thereafter, the system board 802 that has the data transfers the data requested via the crossbar board 900 to the system board 800 (S914 to S915).

When a fault is detected in such a server system, the system board transmits a special packet for announcing the fault within the server system to all system boards within the server system to thereby notify all system boards of the fault. The system boards that have received the special packet perform respective fault correction processes.

As an exemplary fault correction process, the system board, upon reception of an instruction from an operating system (OS) the system board has, suspends access to, for example, the CPU and a memory owned by the system board in which the fault has occurred. If the fault has occurred in the system board 803 in FIG. 12, the system boards 800 to 802 suspend packet transmission to the system board 803. This results in the system board 803 in which the fault has occurred being disconnected from the system.

If a fault occurs in a crossbar board, the system board performs data transfer by way of another crossbar board different from the crossbar board in which the fault has occurred. If a fault has occurred in the crossbar board 900 in FIG. 12, the system boards 800 to 803 transmit packets by way of the crossbar board 901. Related examples are described in Japanese Laid-open Patent Publication No. 2006-39897 and Japanese Laid-open Patent Publication No. 2004-72547.

The related art described above, however, entails a problem in that the crossbar boards is not possible to be subjected to dynamic maintenance during system operation. Specifically, the crossbar board serves only as a communication path that connects together the system boards and does not have any resource that can be accessed by the OS the system board has. Thus, in the server system, the OS of the system board is unable to access the crossbar board and bring the crossbar board into a state of being disconnectable from the server system.

For example, the crossbar board is unable to respond to access from the OS of the system board and empty packets left in the crossbar board. Thus, the related art does not allow the crossbar board to be brought into the state of being disconnectable from the server system, so that the crossbar board is not possible to be subjected to dynamic maintenance during system operation.

Additionally, the system board changes the crossbar board via which to communicate to thereby suspend transmission of packets to the crossbar board subjected to maintenance. As a result, packets are no longer transmitted to the crossbar board subjected to maintenance. When all packets retained by the crossbar board subjected to maintenance have been transmitted, the crossbar board may be emptied of residual packets. Even in such a case, however, the crossbar board, having no resources to be accessed from the OS the system board has, is unable to notify the server system that the crossbar board is emptied of residual packets.

Specifically, the server system is unable to bring the crossbar board into the state of being disconnectable from the server system even with the crossbar board emptied of residual packets. Thus, in the related art, the crossbar board is not possible to be subjected to dynamic maintenance during system operation.

SUMMARY

According to an aspect of an embodiment, a server system includes a service processor, a plurality of system boards and a plurality of crossbar boards connecting the system boards. The service processor includes a first notifier that notifies each of the crossbar boards of a crossbar board subjected to maintenance. The crossbar boards each include a first transmitter that, when notified by the service processor that the crossbar board subjected to maintenance is another crossbar board, generates a suspension packet for suspending packet transmission to the another crossbar board and transmits the suspension packet to each of the system boards. The system boards each include a suspender that, when receiving the suspension packet from the crossbar board, suspends packet transmission to the crossbar board subjected to maintenance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a diagram illustrating a "packet transmission path" before it is changed by a suspension section;

FIG. 5B is a diagram illustrating the "packet transmission path" after it is changed by the suspension section;

FIG. 7A is a diagram illustrating an exemplary suspension packet generated by a packet generating section;

FIG. 9 is a flowchart illustrating steps of a reconnection process performed by the server system according to the second embodiment;

FIG. 10 is a diagram illustrating a configuration of a server system according to a third embodiment;

FIG. 11A is a diagram illustrating the "packet transmission path" before it is changed by the server system according to the third embodiment;

FIG. 11B is a diagram illustrating the "packet transmission path" after it is changed by the server system according to the third embodiment;

FIG. 13 is a diagram illustrating steps of a data transfer process performed among system boards.

DESCRIPTION OF EMBODIMENTS

Preferred embodiments of the present invention will be explained with reference to accompanying drawings. These embodiments are not intended to limit the present invention.

[a] First Embodiment

Configuration of Server System

Figure 1:
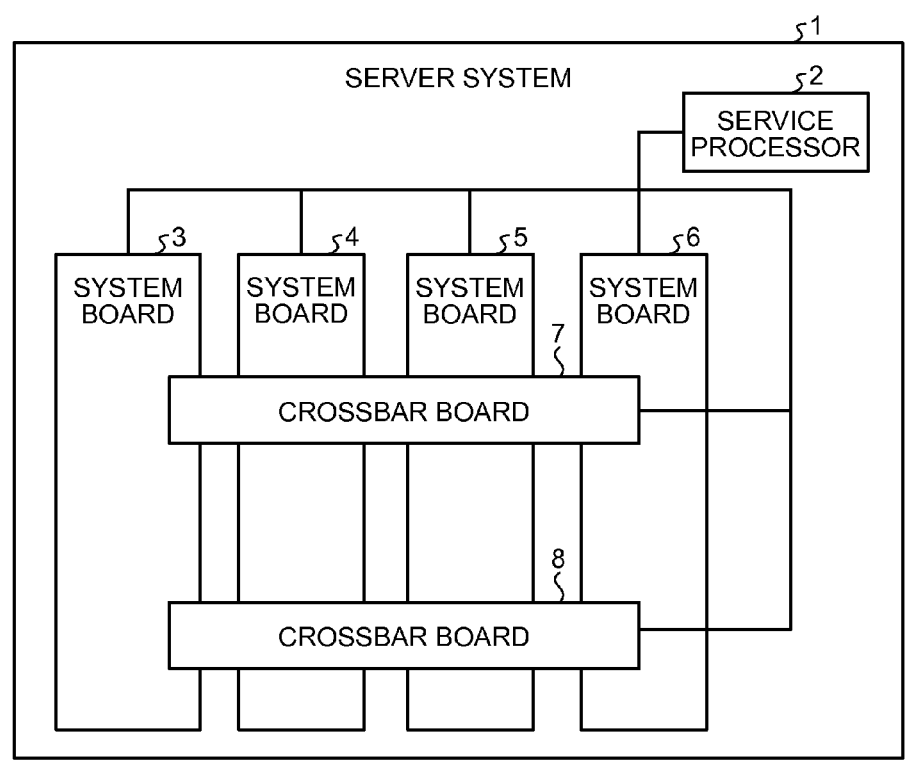
FIG. 1 is a diagram illustrating a configuration of a server system according to a first embodiment.

A configuration of a server system according to a first embodiment will be explained with reference to FIG. 1. FIG. 1 is a diagram illustrating the configuration of the server system according to the first embodiment. As illustrated in FIG. 1, this server system 1 includes a service processor 2, system boards 3, 4, 5, 6, and crossbar boards 7, 8. In this server system 1, the system boards 3, 4, 5, 6 are mutually communicably connected to each other by the crossbar boards 7, 8. Additionally, the service processor 2 is connected to the system boards 3 to 6 and the crossbar boards 7 to 8 using, for example, an inter-integrated circuit (I2C) and a joint test action group (JTAG).

The service processor 2 operates independently of processors mounted on the system boards 3 to 6 within the server system 1 to control the server system 1. For example, the service processor 2 has firmware independent of the server system 1. Through control by this firmware, the service processor 2, for example, sets power on and power off operations, controls resetting, and performs log processing of the system boards 3 to 6 and the crossbar boards 7 to 8.

Additionally, the service processor 2 manages faults that have occurred in the server system 1. Specifically, the service processor 2 uses a power source separate from that for the server system 1. When the server system 1 is shut down due to a fault occurring in the server system 1, the service processor 2 receives an input from an administrator of the server system 1 to thereby perform a fault correction process.

The system boards 3 to 6 each have a central processing unit (CPU) to perform, for example, various types of calculation processes. The crossbar boards 7 to 8 connect the system boards 3 to 6, transferring results of calculations performed within each system board, data retained by each system board, and the like to other system boards.

In the server system 1 configured as described above, the service processor 2 notifies each of the crossbar boards 7 to 8 of a crossbar board subjected to maintenance. Any of the crossbar boards 7 to 8, if notified by the service processor 2 that the crossbar board subjected to maintenance is another crossbar board, generates a suspension packet for suspending packet transmission to the another crossbar board. The crossbar board then transmits the generated suspension packet to each of the system boards 3 to 6.

Any of the crossbar boards 7 to 8, if notified by the service processor 2 that the crossbar board subjected to maintenance is the crossbar board itself, monitors packets within the crossbar board itself and determines whether all of the packets have been transmitted to a destination system board. The crossbar board subjected to maintenance, if determining that all of the packets within the crossbar board itself have been transmitted to the destination system board, notifies the service processor 2 that no more packets exist in the crossbar board subjected to maintenance. The system boards 3 to 6, if it receives a suspension packet from the crossbar board subjected to maintenance, suspends packet transmission to the crossbar board subjected to maintenance.

Processing Operations of Server System

Figure 2:
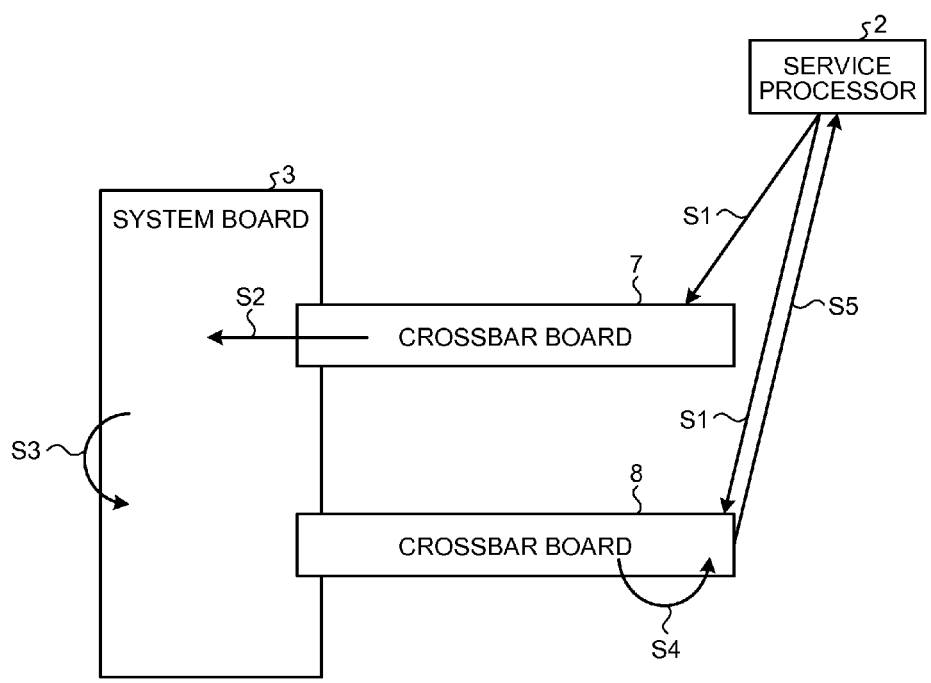
FIG. 2 is a diagram illustrating processing operations of the server system according to the first embodiment.

Specific examples of processing operations of the server system 1 will be explained with reference to FIG. 2. FIG. 2 is a diagram illustrating the processing operations of the server system according to the first embodiment. An exemplary case to be described here assumes that the crossbar board 8 is to be subjected to maintenance in the server system 1. For convenience sake, FIG. 2 illustrates only the service processor 2, the system board 3, and the crossbar boards 7 to 8 illustrated in FIG. 1.

The service processor 2 notifies the crossbar boards 7 to 8 of the crossbar board 8 that is to be subjected to maintenance (S1). The crossbar board 7 generates a suspension packet and transmits it to each of the system boards 3 to 6 (S2). The system boards 3 to 6, when having received the suspension packet from the crossbar board 7, suspend packet transmission to the crossbar board 8 subjected to maintenance (S3).

Additionally, the crossbar board 8 monitors the packets within the crossbar board 8 itself and determines whether all of the packets have been transmitted (S4). The crossbar board 8, if determining that all of the packets have been transmitted, notifies the service processor 2 that no more packets exist in the crossbar board 8 subjected to maintenance (S5).

As described heretofore, in the first embodiment, the service processor 2, when notified of the crossbar board 8 subjected to maintenance, causes each of the system boards 3 to 6 to suspend the packet transmission to the crossbar board 8 subjected to maintenance. Additionally, the service processor 2 causes a determination to be made as to whether packets yet to be transmitted exist in the crossbar board 8 subjected to maintenance and causes packets left to be monitored until no more packets are left. When no more packets are left, the crossbar board 8 then notifies the service processor 2 that no more packets exist.

In the manner described above, the server system 1 places the crossbar board 8 subjected to maintenance in the state of being disconnectable from the server system 1. Thus, the server system 1 according to the first embodiment is capable of performing dynamic maintenance of the crossbar board 8 subjected to maintenance.

[b] Second Embodiment

The service processor 2, the system boards 3 to 6, and the crossbar boards 7 to 8 included in the server system 1 explained in the first embodiment will be explained in detail as a second embodiment. Like or corresponding elements are identified by the same reference numerals as those used for the first embodiment. The following describes, in sequence, a configuration of the service processor, a configuration of the system board, a configuration of the crossbar board, processing steps, and effects achieved by the second embodiment. It is noted that, in the second embodiment, the numbers of the service processors, system boards, and crossbar boards are only exemplary and are not restrictive.

Configuration of Service Processor

Figure 3:
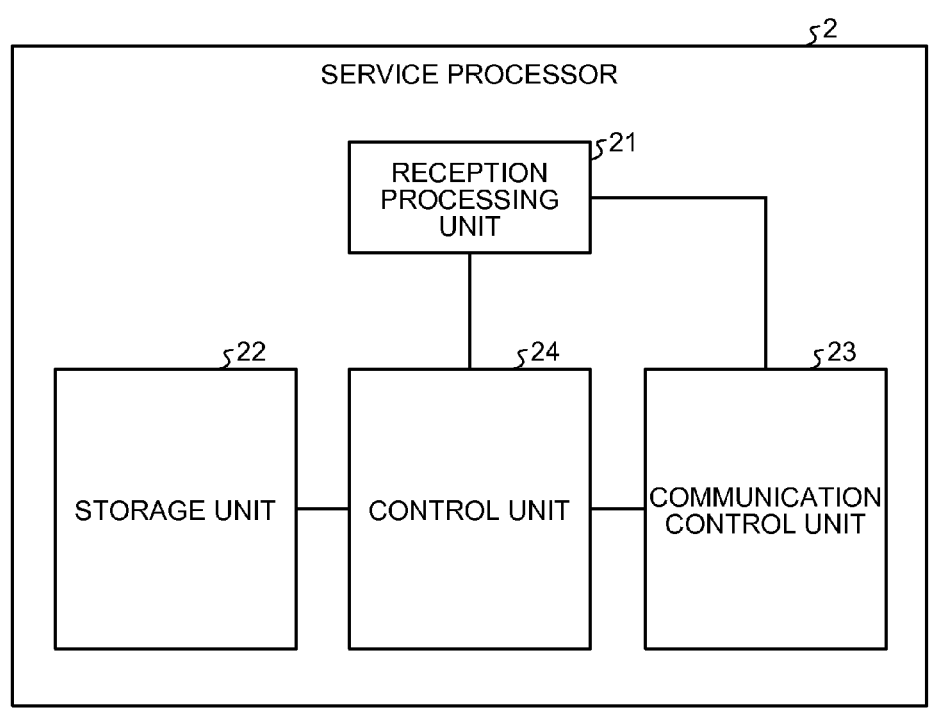
FIG. 3 is a block diagram illustrating a configuration of a service processor according to a second embodiment.

The configuration of the service processor 2 according to the second embodiment will be explained with reference to FIG. 3. FIG. 3 is a block diagram illustrating the configuration of the service processor according to the second embodiment. As illustrated in FIG. 3, the service processor 2 according to the second embodiment includes a reception processing unit 21, a storage unit 22, a communication control unit 23, and a control unit 24. The service processor 2 is, for example, an integrated circuit, such as an application specific integrated circuit (ASIC) and a field programmable gate array (FPGA), or an electronic circuit, such as a CPU and a micro-processing unit (MPU).

The reception processing unit 21 receives from an administrator an input of an instruction to manage the server system 1 via an input device not illustrated and notifies the communication control unit 23 of details of the received input. If, for example, an input of an instruction to maintain the crossbar board subjected to maintenance out of the crossbar boards is received from the administrator, the reception processing unit 21 notifies the communication control unit 23 of the crossbar board subjected to maintenance. Alternatively, if an instruction to, for example, incorporate the crossbar board that has undergone the maintenance in the server system 1 is received from the administrator, the reception processing unit 21 notifies the communication control unit 23 of the crossbar board to be incorporated in the server system 1.

Additionally, the reception processing unit 21 notifies the administrator of a status of the server system 1 via an output device not illustrated. If, for example, notified by the communication control unit 23 that connection of an interface between the crossbar board subjected to maintenance and each of the system boards 3 to 6 has been disconnected, the reception processing unit 21 notifies the administrator of a physical removal of the crossbar board subjected to maintenance.

The storage unit 22 is a storage device, such as a semiconductor memory element or a hard disk, that stores therein, for example, data for various types of processing performed by the control unit 24 and firmware. For example, the storage unit 22 stores therein a log that records operations of the server system 1.

The communication control unit 23 has an interface and is connected to the system boards 3 to 6 and the crossbar boards 7 to 8 using, for example, the I2C and the JTAG. The communication control unit 23 controls transfer of packets between the system boards 3 to 6 and the crossbar boards 7 to 8. The communication control unit 23 is an exemplary first notifier.

The communication control unit 23, if notified by the reception processing unit 21 of the crossbar board subjected to maintenance, notifies the crossbar boards 7 to 8 of the crossbar board subjected to maintenance. In addition, the communication control unit 23 is notified by the crossbar board subjected to maintenance that no more packets exist in the crossbar board subjected to maintenance. In this case, the communication control unit 23 notifies the crossbar board subjected to maintenance and each of the system boards to disconnect the connection of the interface between the crossbar board subjected to maintenance and each of the system boards. The communication control unit 23 instructs the crossbar board subjected to maintenance to turn off power. Furthermore, the communication control unit 23 notifies the reception processing unit 21 that the crossbar board subjected to maintenance is in the state of being disconnectable from the server system 1.

The communication control unit 23, if notified by the reception processing unit 21 that the crossbar board that has undergone the maintenance is to be incorporated in the server system 1, notifies the crossbar board subjected to maintenance that the maintenance has been completed. The communication control unit 23 instructs the crossbar board that has undergone the maintenance to turn on power. Then, the communication control unit 23 reconnects each of the system boards 3 to 6 and the crossbar board that has undergone the maintenance.

Additionally, the communication control unit 23 transmits a test signal from the JTAG to a test circuit built into each of the system boards 3 to 6 and the crossbar boards 7 to 8, to thereby determine whether they are fully operational. The communication control unit 23, if determining that any of the system boards 3 to 6 and the crossbar boards 7 to 8 is not operational, notifies the reception processing unit 21 of a specific non-operational one of the system boards 3 to 6 and the crossbar boards 7 to 8. This enables the administrator to instruct the reception processing unit 21 to perform dynamic maintenance of the server system 1 with the specific non-operational one of the system boards 3 to 6 and the crossbar boards 7 to 8 being subjected to maintenance.

It is noted that it is not limited only to the communication control unit 23 notifying, if determining that any of the system boards 3 to 6 and the crossbar boards 7 to 8 is not operational, the reception processing unit 21 of the specific non-operational one of the system boards 3 to 6 and the crossbar boards 7 to 8. For example, the communication control unit 23 may notify, if determining that the crossbar board 8 is not operational, each of the crossbar boards 7 to 8 of the crossbar board 8 that is subjected to maintenance.

The control unit 24 performs various types of operations that manage the server system 1. For example, the control unit 24 sets operations, controls resetting, and performs log processing of the system boards 3 to 6 and the crossbar boards 7 to 8 through the control by the firmware stored in the storage unit 22. The control unit 24 includes an internal memory that stores therein a control program, a program specifying steps of various processes and the like, and data.

Configuration of System Board

A configuration of the system boards 3 to 6 according to the second embodiment will be explained with reference to FIG. 4. The system boards 3 to 6 according to the second embodiment have a configuration identical to each other and only the system board 3 will here be explained with explanations of the system boards 4 to 6 omitted.

Figure 4:
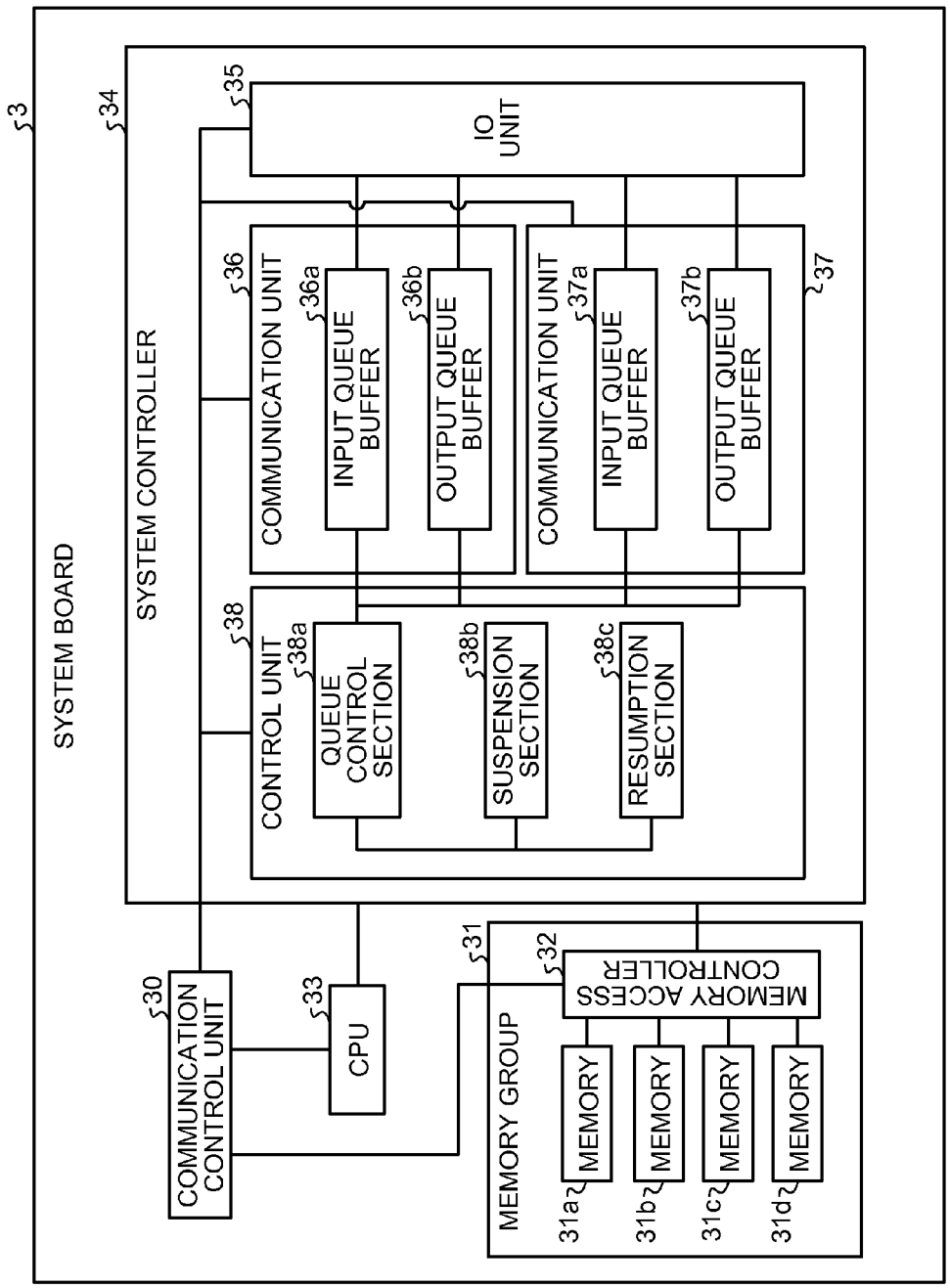
FIG. 4 is a block diagram illustrating a configuration of a system board according to the second embodiment.

FIG. 4 is a block diagram illustrating the configuration of the system board according to the second embodiment. As illustrated in FIG. 4, the system board 3 includes a communication control unit 30, a memory group 31, a CPU 33, and a system controller 34.

The communication control unit 30 is connected to the service processor 2 not illustrated, the memory group 31, the CPU 33, and the system controller 34 using, for example, the I2C and the JTAG and controls inputs and outputs of information that controls operations of the system board 3. The communication control unit 30 further controls inputs and outputs of information that controls a maintenance process.

As an example, the communication control unit 30 receives notice of, for example, power on, power off, disconnection of a connection to a specified crossbar board, and reconnection to a specified crossbar board from the service processor 2.

Additionally, the communication control unit 30, if notified by the service processor 2 that the connection to the crossbar board 8 is to be disconnected, disconnects the connection of the interface with the crossbar board 8. If notified by the service processor 2 that the connection to the crossbar board 8 is to be reconnected, the communication control unit 30 reconnects the connection of the interface with the crossbar board 8.

The memory group 31 includes memories 31a to 31d and a memory access controller 32. The memories 31a to 31d store therein, for example, data used for various types of calculations performed by the CPU 33. The memory access controller 32 controls access to the memories 31a to 31d received from the CPU 33. The CPU 33 is a processor that reads data stored in the memories 31a to 31d and performs various types of calculation processes and the like. In addition, the CPU 33 stores results of the various types of calculation processes and the like in the memories 31a to 31d. It is noted that the numbers of the CPUs, memories, and the memory access controllers included in the system board 3 are not limited only to those illustrated in FIG. 4 and a user may change the numbers as desired.

The system controller 34 is, for example, an integrated circuit, such as an ASIC and a FPGA and includes an input output (IO) unit 35, communication units 36, 37, and a control unit 38. Additionally, the system controller 34 includes an internal memory for storing therein a control program, a program specifying steps of various processes and the like, and data. The system controller 34 controls transfer of, for example, data between the CPU 33 and the other system boards 4 to 6, and between the memory access controller 32 and the other system boards 4 to 6.

The IO unit 35 has an interface that includes at least one communication port. The IO unit 35 controls information transmitted to and from the other system boards. For example, the IO unit 35 receives a packet from the crossbar board 7 and outputs the received packet to an input queue buffer 36a. Additionally, the IO unit 35 fetches a packet from an output queue buffer 36b and transmits the fetched packet to the crossbar board 7.

The communication units 36, 37 have a configuration identical to each other. The configuration of only the communication unit 36 will here be explained with explanations of the communication unit 37 omitted. For example, the communication unit 36 transmits and receives packets to and from the crossbar board 7 and the communication unit 37 transmits and receives packets to and from the crossbar board 8. Connection between the communication units 36 to 37 and the crossbar boards 7 to 8 is not limited only to this and may be changed by the user as desired.

The communication unit 36 includes the input queue buffer 36a and the output queue buffer 36b. For example, the input queue buffer 36a is controlled by first-in first-out (FIFO) and stores therein packets output from the IO unit 35. For example, the output queue buffer 36b is controlled by FIFO and stores therein packets output from a queue control section 38a. Similarly, the communication unit 37 includes an input queue buffer 37a and an output queue buffer 37b. It is noted that the numbers of the input queue buffers and the output queue buffers included in the communication units 36, 37 are not limited only to these and may be changed as desired.

The control unit 38 includes the queue control section 38a, a suspension section 38b, and a resumption section 38c. In addition, the control unit 38 includes an internal memory for storing therein a control program, a program specifying steps of various processes and the like, and data. For example, the internal memory of the control unit 38 stores therein a "packet transmission path" to which the queue control section 38a refers when outputting packets to the output queue buffer 36b and the output queue buffer 37b.

The queue control section 38a fetches a packet from the communication unit 36 or 37 and outputs the packet to the communication unit 36 or 37. For example, the queue control section 38a fetches a packet stored in the input queue buffer 36a and outputs the packet to the output queue buffer 36b or the output queue buffer 37b. Alternatively, the queue control section 38a fetches a packet stored in the input queue buffer 36a and outputs the fetched packet to the memory access controller 32 or the CPU 33.

Additionally, the queue control section 38a outputs the packet output from the memory access controller 32 or the CPU 33 to the output queue buffer 36b or the output queue buffer 37b. Furthermore, the queue control section 38a outputs the data output from the CPU 33 or the like to the memory access controller 32. The memory access controller 32, as a result, causes the data output from the CPU 33 or the like to be stored in the memories 31a to 31d.

Additionally, if the packet fetched from the input queue buffer 36a or 37a is a suspension packet, the queue control section 38a outputs the fetched suspension packet to the suspension section 38b. If a special packet "1110010" that indicates a suspension/resumption packet is stored in "Ope Code" of the fetched packet and a "1" is stored in "Stop" of the fetched packet, the queue control section 38a determines that the fetched packet is a suspension packet.

Additionally, if the packet fetched from the input queue buffer 36a or 37a is a resumption packet, the queue control section 38a outputs the fetched resumption packet to the resumption section 38c. If a special packet "1110010" that indicates a suspension/resumption packet is stored in "Ope Code" of the fetched packet and a "0" is stored in "Stop" of the fetched packet, the queue control section 38a determines that the fetched packet is a resumption packet.

When receiving a suspension packet, the suspension section 38b changes the transmission path so that the packet intended for the crossbar board subjected to maintenance is transmitted to the crossbar board not subjected to maintenance.

For example, when receiving a suspension packet from the queue control section 38a, the suspension section 38b changes the "packet transmission path" stored in the internal memory of the control unit 38. The queue control section 38a refers to the "packet transmission path" when outputting a packet to the output queue buffers 36b and 37b. Specifically, the change of the "packet transmission path" by the suspension section 38b results in the queue control section 38a transmitting the packet intended for the crossbar board subjected to maintenance to the crossbar board not subjected to maintenance.

The change of the "packet transmission path" by the suspension section 38b will be explained with reference to FIGS. 5A and 5B. FIG. 5A is a diagram illustrating the "packet transmission path" before it is changed by the suspension section. FIG. 5B is a diagram illustrating the "packet transmission path" after it is changed by the suspension section. An exemplary case to be explained hereunder assumes that the suspension section 38b receives from the queue control section 38a a suspension packet for suspending packet transmission to the crossbar board 8.

FIG. 5A stores information that indicates whether a "transmission path" has been changed to correspond to a "destination". For example, the "destination" in FIG. 5A stores, for example, "system board 3, CPU", "system board 3, memory", "system board 4, CPU", and "system board 4, memory" as information that indicates a final destination of the packet.

The "transmission path" in FIG. 5A stores "system board 3", "crossbar board 7", and "crossbar board 8" as information that indicates the crossbar board via which the packet is transmitted to the final destination.

The "change" in FIG. 5A stores a "0" or a "1" as information that indicates whether the packet transmission path has been changed. It is noted that the "0" denotes that the packet transmission path is not changed or is returned to an original after it has been changed, and the "1" denotes that the packet transmission path has been changed.

Specifically, FIG. 5A indicates following. The packet that has the CPU of the system board 3 or the memory of the system board 3 as its destination has the system board 3 as its destination and thus does not pass any of the crossbar boards. Alternatively, the packet that has the CPU of the system board 4 as its destination has the crossbar board 7 as its transmission path and the packet that has the memory of the system board 4 as its destination has the crossbar board 8 as its transmission path. Similarly, the packet that has the CPU of the system board 5 as its destination has the crossbar board 7 as its transmission path and the packet that has the memory of the system board 5 as its destination has the crossbar board 8 as its transmission path. Similarly, the packet that has the CPU of the system board 6 as its destination has the crossbar board 7 as its transmission path and the packet that has the memory of the system board 6 as its destination has the crossbar board 8 as its transmission path. It is noted that, in FIG. 5A, none of the transmission paths has been changed.

The suspension section 38b, if it receives a suspension packet for the crossbar board 8 from the queue control section 38a, changes the "packet transmission path" illustrated in FIG. 5A to that illustrated in FIG. 5B.

For example, as illustrated in FIG. 5B, the suspension section 38b causes the "crossbar board 7" to be stored in the "transmission path" and the "1" to be stored in the "change" for the packets that have the memory of the system board 4, the memory of the system board 5, and the memory of the system board 6 as their destinations. Additionally, the suspension section 38b causes the crossbar board 8 as the original crossbar board to be stored in the internal memory of the control unit 38.

Reference is made back to FIG. 4. The resumption section 38c, if it receives a resumption packet from the queue control section 38a, resumes packet transmission to the crossbar board that has undergone the maintenance. For example, upon reception of the resumption packet from the queue control section 38a, the resumption section 38c refers to the "packet transmission path" stored in the internal memory of the control unit 38 and determines whether there is any packet having its transmission path changed. The resumption section 38c, if determining that there is a packet having its transmission path changed, changes the transmission path so as to transmit the packet having its transmission path changed to the crossbar board that has undergone the maintenance.

Specifically, the resumption section 38c determines whether a "1" is stored in the "change" of the "packet transmission path". If the "1" is stored in the "change", the resumption section 38c determines that the transmission path has been changed.

Then, the resumption section 38c, having determined that the transmission path was changed, reads the original stored in the internal memory of the control unit 38 and changes the "packet transmission path" illustrated in FIG. 5B to that as illustrated in FIG. 5A. For example, the resumption section 38c causes the "crossbar board 8" to be stored in the "transmission path" and a "0" to be stored in the "change" for the packets having the memory of the system board 4, the memory of the system board 5, and the memory of the system board 6 as their destinations.

Configuration of Crossbar Board

A configuration of the crossbar boards 7 to 8 according to the second embodiment will be explained with reference to FIG. 6. The crossbar boards 7 to 8 according to the second embodiment have a configuration identical to each other and only the crossbar board 7 will here be explained with explanations of the crossbar board 8 omitted.

Figure 6:
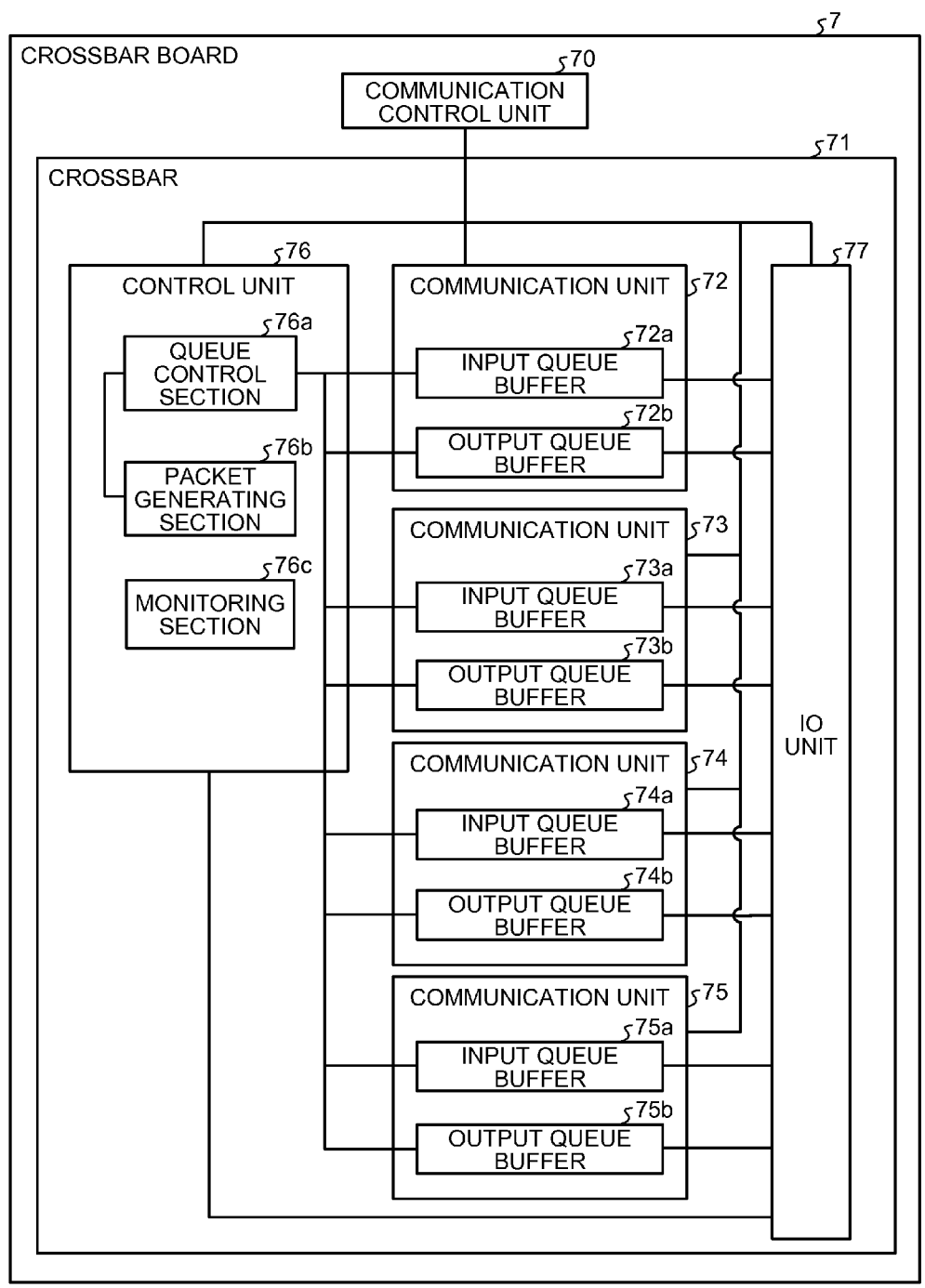
FIG. 6 is a block diagram illustrating a configuration of a crossbar board according to the second embodiment.

FIG. 6 is a block diagram illustrating the configuration of the crossbar board according to the second embodiment. As illustrated in FIG. 6, the crossbar board 7 according to the second embodiment includes a communication control unit 70 and a crossbar 71.

The communication control unit 70 is connected to the service processor 2 not illustrated and the crossbar 71 using, for example, the $I^2C$ and the JTAG and controls inputs and outputs of information that controls operations of the crossbar board 7 and inputs and outputs of information that controls the maintenance process. Specifically, the communication control unit 70 receives, for example, power on and power off from the service processor 2. It is noted that the communication control unit 70 is an exemplary second notifier.

Additionally, the communication control unit 70, when receiving notice from the service processor 2 that the connection to each of the system boards 3 to 6 is to be disconnected, disconnects the connection to the interface to each of the system boards 3 to 6. Alternatively, if notice is received from the service processor 2 that the connection to each of the system boards 3 to 6 is to be reconnected, the communication control unit 70 reconnects the connection to the interface to each of the system boards 3 to 6.

Furthermore, if notice is received from the service processor 2 that the crossbar board subjected to maintenance is the crossbar board itself, the communication control unit 70 notifies a monitoring section 76c that the crossbar board itself is subjected to maintenance.

Additionally, if notice is received from the service processor 2 that the crossbar board subjected to maintenance is another crossbar board, the communication control unit 70 notifies a packet generating section 76b that the another crossbar board is subjected to maintenance.

Additionally, the communication control unit 70, if notified by the monitoring section 76c that all packets have been transmitted, notifies the service processor 2 that no more packets exist in the crossbar board subjected to maintenance. If notice is received from the service processor to generate a resumption packet, the communication control unit 70 notifies the packet generating section 76b to cause the resumption packet to be generated.

The crossbar 71 is, for example, an integrated circuit, such as an ASIC and a FPGA and includes communication units 72, 73, 74, 75, a control unit 76, and an IO unit 77. The crossbar 71 includes an internal memory for storing therein a control program, a program specifying steps of various processes and the like, and data. It is noted that the number of the communication units included in the crossbar 71 is not limited only to that illustrated in FIG. 6 and the user may change the number as desired.

The communication units 72 to 75 have a configuration identical to each other. Only the communication unit 72 will here be explained with explanations for the configuration of the communication units 73 to 75 omitted. For example, the communication unit 72 transmits and receives packets to and from the system board 3, the communication unit 73 transmits and receives packets to and from the system board 4, the communication unit 74 transmits and receives packets to and from the system board 5, and the communication unit 75 transmits and receives packets to and from the system board 6. Connection between the communication units 72 to 75 and the system boards 3 to 6 is not limited only to this and may be changed by the user as desired.

The communication unit 72 includes an input queue buffer 72a and an output queue buffer 72b. For example, the input queue buffer 72a is controlled by FIFO and stores therein packets output from the IO unit 77. For example, the output queue buffer 72b is controlled by FIFO and stores therein packets output from a queue control section 76a.

The control unit 76 includes the queue control section 76a, the packet generating section 76b, and the monitoring section 76c. The queue control section 76a fetches packets from the communication units 72 to 75 and outputs the packets to the communication units 72 to 75. For example, the queue control section 76a fetches packets stored in input queue buffers 72a to 75a and outputs the fetched packets to output queue buffers 72b to 75b.

Additionally, the queue control section 76a transmits a suspension packet generated by the packet generating section 76b to each of the system boards 3 to 6. For example, the queue control section 76a, if it receives a suspension packet from the packet generating section 76b, outputs the received suspension packet to each of the output queue buffers 72b to 75b. This results in the suspension packet generated by the packet generating section 76b being transmitted by the IO unit 77 to each of the system boards 3 to 6.

Additionally, the queue control section 76a transmits a resumption packet generated by the packet generating section 76b to each of the system boards 3 to 6. For example, the queue control section 76a, if it receives a resumption packet from the packet generating section 76b, outputs the received resumption packet to each of the output queue buffers 72b to 75b. This results in the resumption packet generated by the packet generating section 76b being transmitted by the IO unit 77 to each of the system boards 3 to 6.

The packet generating section 76b generates the suspension packet for suspending packet transmission to the crossbar board and the resumption packet for resuming packet transmission to the crossbar board. The following describes in sequence the generation of the suspension packet and the generation of the resumption packet. It is noted that the packet generating section 76b is an exemplary first transmitter and an exemplary second transmitter.

Generation of Suspension Packet

The packet generating section 76b, if notified by the communication control unit 70 that the crossbar board subjected to maintenance is another crossbar board, generates the suspension packet for suspending packet transmission to the another crossbar board. The suspension packet is a type of the special packet generated by the server system 1.

The following describes an exemplary definition of the suspension packet. The suspension packet retains information associated with "Target-XB" in bits 0 to 7, "Stop" in bit 23, and "Ope Code" in bits 24 to 30. The "Target-XB" of the suspension packet stores therein information indicating the crossbar board subjected to maintenance. For example, bit 0 corresponds to the crossbar board 7 and bit 1 corresponds to the crossbar board 8. If a "1" is stored in a bit, the crossbar board corresponding to the bit is subjected to maintenance. If a "0" is stored in a bit, the crossbar board corresponding to the bit is not subjected to maintenance.

The "Stop" stores therein information that indicates either a suspension packet or not. For example, a "1" stored therein indicates a suspension packet and a "0" stored therein indicates not being a suspension packet. The "Ope Code" stores therein information indicating the type of the special packet. For example, "1110010" stored therein indicates a suspension packet or a resumption packet.

The suspension packet generated by the packet generating section 76b will be explained with reference to the example illustrated in FIG. 7A. FIG. 7A is a diagram illustrating an exemplary suspension packet generated by the packet generating section. FIG. 7A illustrates that the packet illustrated therein is a suspension packet for suspending packet transmission to the crossbar board 8.

Next, the packet generating section 76b outputs the generated suspension packet to the queue control section 76a. The queue control section 76a then outputs the suspension packet generated by the packet generating section 76b to the output queue buffers 72b to 75b. This results in the IO unit 77 fetching the suspension packet from each of the output queue buffers 72b to 75b, which, in turn, results in each suspension packet being transmitted to each of the system boards 3 to 6.

Generation of Resumption Packet

Additionally, the packet generating section 76b, if it receives notice from the communication control unit 70 that the maintenance of the crossbar board itself is completed, generates a resumption packet for resuming packet transmission to the crossbar board itself.

The resumption packet retains information associated with "Target-XB" in bits 0 to 7, "Stop" in bit 23, and "Ope Code" in bits 24 to 30. The "Target-XB" of the resumption packet stores therein information indicating the crossbar board subjected to maintenance. For example, a bit 0 corresponds to the crossbar board 7 and a bit 1 corresponds to the crossbar board 8. If a "1" is stored in a bit, the crossbar board corresponding to the bit is subjected to maintenance. If a "0" is stored in a bit, the crossbar board corresponding to the bit is not subjected to maintenance.

The "Stop" stores therein information that indicates either a resumption packet or not. For example, a "0" stored therein indicates a resumption packet and a "1" stored therein indicates not being a resumption packet. The "Ope Code" stores therein information indicating the type of the special packet. For example, "1110010" stored therein indicates a suspension packet or a resumption packet.

Figure 7B:
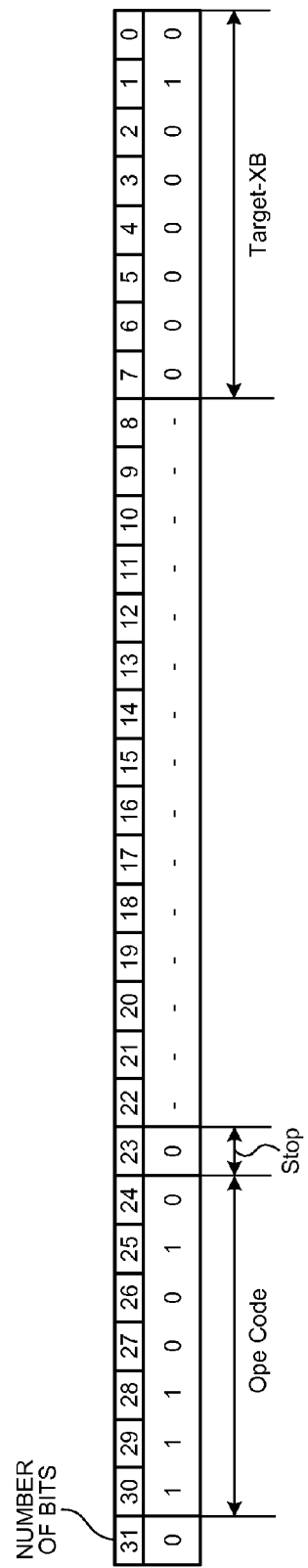
FIG. 7B is a diagram illustrating an exemplary resumption packet generated by the packet generating section.

The resumption packet generated by the packet generating section 76b will be explained with reference to the example illustrated in FIG. 7B. FIG. 7B is a diagram illustrating an exemplary resumption packet generated by the packet generating section. FIG. 7B illustrates that the packet illustrated therein is a resumption packet for resuming packet transmission to the crossbar board 8.

Next, the packet generating section 76b outputs the generated resumption packet to the queue control section 76a. The queue control section 76a then outputs the resumption packet generated by the packet generating section 76b to each of the output queue buffers 72b to 75b. This results in the IO unit 77 fetching the resumption packet from each of the output queue buffers 72b to 75b, which, in turn, results in each resumption packet being transmitted to each of the system boards 3 to 6.

Reference is now made back to FIG. 6. The monitoring section 76c, if it receives notice from the communication control unit 70 that the crossbar board subjected to maintenance is the crossbar board itself, monitors packets in the crossbar board itself. For example, the monitoring section 76c, if it is notified by the communication control unit 70 to monitor packets left in the crossbar board itself, monitors the packets stored in the communication units 72 to 75 and determines whether all of the packets have been transmitted. If determining that all of the packets have been transmitted, the monitoring section 76c notifies the communication control unit 70 that all of the packets have been transmitted. As a result, the communication control unit 70 notifies the service processor 2 that no more packets exist in the crossbar board subjected to maintenance. It is noted that the monitoring section 76c is an exemplary determiner.

The IO unit 77 is an interface that includes at least one communication port. The IO unit 77 controls information transmitted to and from the system boards.

For example, the IO unit 77 controls transmission and reception of packets relative to the system board and inputs and outputs relative to the service processor of information that controls operations of the server system. Specifically, the IO unit 77 receives packets from the system boards 3 to 6 and identifies a transmitter from a header area of the received packet. Then, the IO unit 77 transmits the received packet to the input queue buffer connected to the identified transmitter. Additionally, the IO unit 77 fetches a packet from the output queue buffer and transmits the fetched packet to the transmitter system board.

Processing Steps

Figure 8:
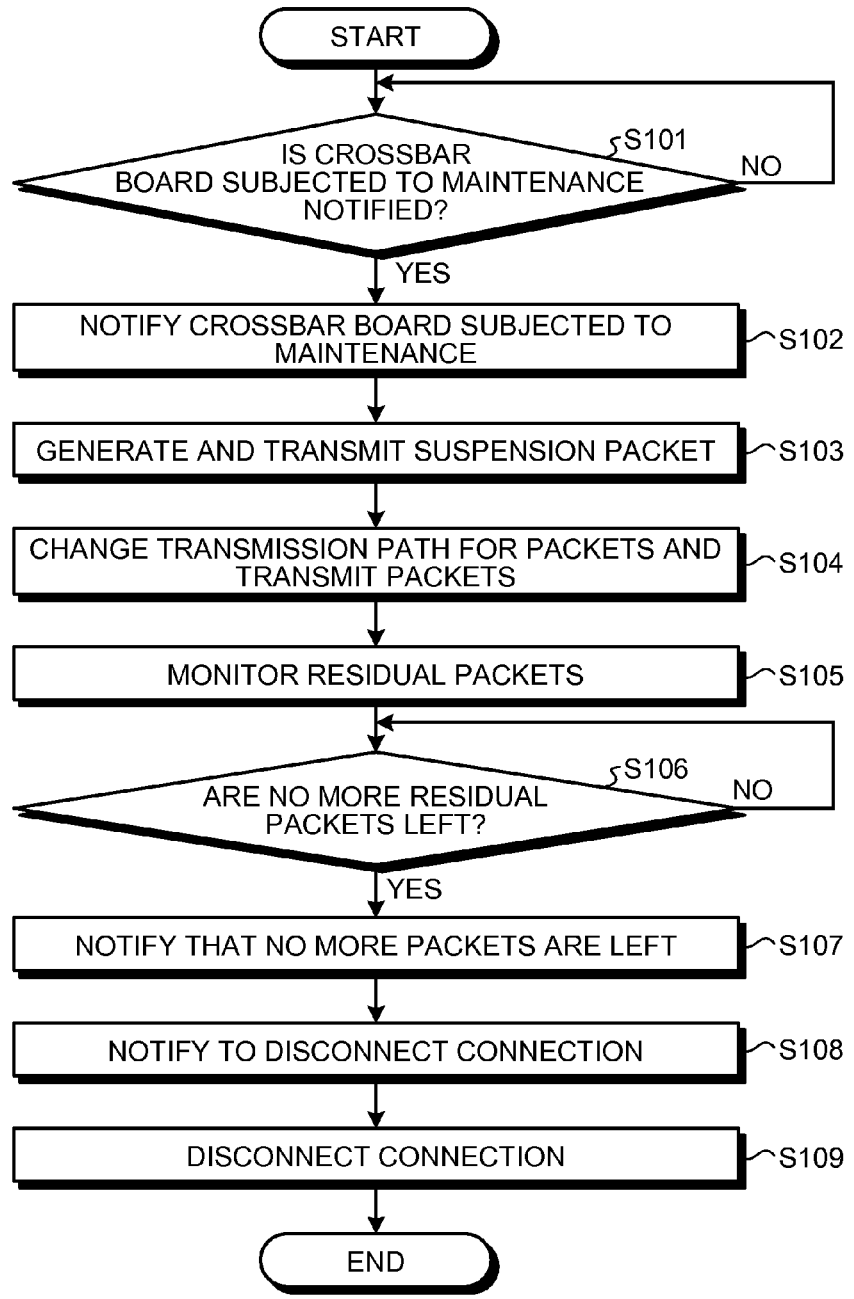
FIG. 8 is a flowchart illustrating steps of a disconnection process performed by the server system according to the second embodiment.
Figure 12:
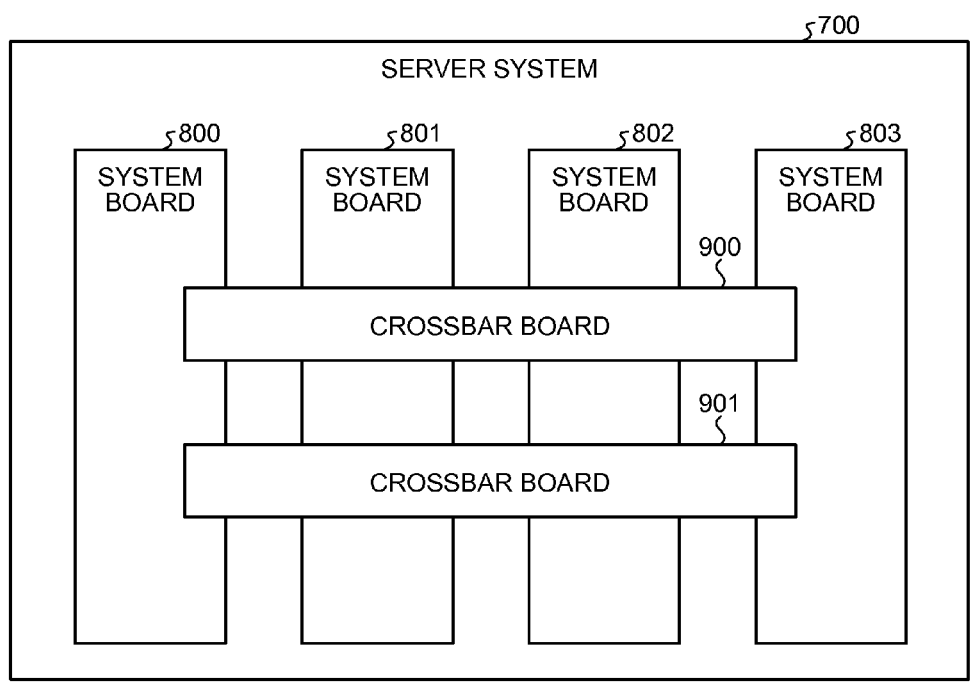
FIG. 12 is a diagram illustrating a configuration of a server system according to a related art.

Steps of processes performed by the server system 1 according to the second embodiment will be explained with reference to FIGS. 8 to 9. A disconnection process will be explained with reference to FIG. 8 and a reconnection process will be explained with reference to FIG. 9. FIG. 8 is a flowchart illustrating steps of a disconnection process performed by the server system according to the second embodiment and FIG. 9 is a flowchart illustrating steps of a reconnection process performed by the server system according to the second embodiment.

Disconnection Process

The disconnection process to be explained hereunder assumes that the crossbar board 8 is the crossbar board subjected to maintenance. As illustrated in FIG. 8, the service processor 2, if notified that the crossbar board 8 out of the crossbar boards is subjected to maintenance (Yes at Step S101), notifies the crossbar boards 7 to 8 of the crossbar board subjected to maintenance (Step S102). The service processor 2 repeats performing the step of Step S101 until it is notified that, of the crossbar boards, the crossbar board 8 is subjected to maintenance. Next, the crossbar board 7 that is not subjected to maintenance generates a suspension packet and transmits the generated suspension packet to all of the system boards 3 to 6 (Step S103). The system boards 3 to 6, having received the suspension packets, change the transmission path for transmission packets intended for the crossbar board 8 subjected to maintenance to that for the crossbar board 7 not subjected to maintenance and transmit the transmission packets (Step S104).

Additionally, the crossbar board 8 subjected to maintenance monitors residual packets (Step S105) and determines whether the residual packets no longer exist (Step S106). The crossbar board 8 subjected to maintenance, if determining that the residual packets no longer exist (Yes at Step S106), notifies the service processor 2 that no more packets are left in the crossbar board 8 itself (Step S107). The crossbar board 8 subjected to maintenance, if determining that the residual packets still exist (No at Step S106), repeats Step S106 to continue monitoring packets left in the crossbar board 8 itself.

The service processor 2, when notified by the crossbar board 8 subjected to maintenance that the residual packets no longer exist, notifies that the crossbar board 8 subjected to maintenance and each of the system boards 3 to 6 are to be disconnected (Step S108). The system board and the crossbar board that have received this notice disconnect the connection of the respective interfaces (Step S109).

Reconnection Process

The reconnection process to be explained hereunder assumes that the crossbar board 8 is the crossbar board that has undergone the maintenance. As illustrated in FIG. 9, the service processor 2, if notified of the completion of the maintenance of the crossbar board 8 (Yes at Step S201), notifies that the connection of the interface between the crossbar board 8 that has undergone the maintenance and each of the system boards 3 to 6 is to be reconnected (Step S202). The service processor 2 repeats performing the step of Step S201 until it is notified of the completion of the maintenance of the crossbar board 8.

The connection of the respective interfaces is reconnected between each of the system boards 3 to 6 and the crossbar board 8 that has undergone the maintenance after having received the notice (Step S203) and it is determined whether the connection is normal (Step S204). The service processor 2, if determining that the reconnection has been normally performed (Yes at Step S204), notifies the crossbar board 8 that has undergone the maintenance to transmit a resumption packet (Step S205). If determining that the reconnection has failed (No at Step S204), the service processor 2 repeats performing reconnection of the interfaces between each of the system boards 3 to 6 and the crossbar board 8 that has undergone the maintenance until it is determined that the reconnection has been successfully performed.

The crossbar board 8 that has received the notice to transmit a resumption packet generates the resumption packet and transmits the generated resumption packet to each of the system boards 3 to 6 (Step S206). Each of the system boards 3 to 6 that have received the resumption packet changes the destination for the packet and resumes transmission (Step S207).

Effects Achieved by Second Embodiment

As described above, the server system 1 according to the second embodiment empties the packets in the crossbar board subjected to maintenance so that the crossbar board subjected to maintenance can be disconnected from the server system. Thus, the server system 1 according to the second embodiment can perform the dynamic maintenance of the crossbar board subjected to maintenance.

Additionally, the system board, if it has suspended packet transmission to the crossbar board subjected to maintenance, transmits the packet to the crossbar board not subjected to maintenance. Thus, the server system according to the second embodiment can transmit the packet intended to be transmitted via the crossbar board subjected to maintenance without delay.

Additionally, in the second embodiment, when the crossbar board subjected to maintenance is emptied of packets and is thus placed in the state of being disconnectable from the server system, only the crossbar board subjected to maintenance is disconnected from the server system. Thus, the server system according to the second embodiment can perform the dynamic maintenance of the crossbar board more safely.

Additionally, the service processor reconnects the connection of the interface between the crossbar board that has undergone the maintenance and each of the system boards. As a result, the server system according to the second embodiment can incorporate the crossbar board that has undergone the maintenance in the system during system operation.

In addition, when the connection of the interface between the crossbar board that has undergone the maintenance and each of the system boards is reconnected, the crossbar board that has undergone the maintenance transmits a resumption packet for resuming packet transmission to each of the system boards. As a result, the server system according to the second embodiment can resume the packet transmission to the crossbar board that has undergone the maintenance.

Additionally, if there is a packet having its transmission path changed when the packet transmission to the crossbar board that has undergone the maintenance is resumed, the system board changes the transmission path for the packet having its transmission path changed to the crossbar board that has undergone the maintenance. As a result, the server system according to the second embodiment can perform transmission by returning the transmission path for the packet having its transmission path changed from the crossbar board subjected to maintenance to the crossbar board not subjected to maintenance to the crossbar board before the change.

Additionally, the server system disconnects the crossbar board subjected to maintenance therefrom by transmitting a suspension packet. Thus, the server system can disable the crossbar board subjected to maintenance without any aid from the software running on the CPU of the system board. Specifically, the server system according to the second embodiment can perform the dynamic maintenance of the crossbar board that has no resources to be accessed by an OS.

[c] Third Embodiment

The first and second embodiments have been described for a case in which four system boards are connected by two crossbar boards. The configuration of the server system is not, however, limited to this. A third embodiment exemplifies dynamic maintenance of the crossbar board in a server system that connects eight system boards with eight crossbar boards. The following describes, in sequence, a configuration of the server system, explanations for processing operations, and effects achieved by the third embodiment. Here, functional units having similar functions are identified by similar reference numerals as the reference numerals in FIG. 1 and detailed explanations therefor will be omitted.

Configuration of Server System

The configuration of this server system 100 according to the third embodiment will be explained with reference to FIG. 10. FIG. 10 is a diagram illustrating the configuration of the server system according to the third embodiment. As illustrated in FIG. 10, the server system 100 according to the third embodiment includes system boards 201 to 208, each including CPU resources, and crossbar boards 301 to 308. The system boards 201 to 208 each include, though not illustrated, four CPUs, four memory groups, and a system controller. The system controller is configured similarly to the system controller 34 explained in the second embodiment and explanations therefor will be omitted. Additionally, the crossbar boards 301 to 308 are configured similarly to the crossbar boards 7 to 8 explained in the second embodiment and explanations therefor will be omitted.

Explanations for Processing Operations

With reference to FIGS. 11A and 11B, the following explains processing operations performed when the crossbar board 301 is subjected to dynamic maintenance in a server system such as the server system 100 described above. FIG. 11A is a diagram illustrating the "packet transmission path" before it is changed by the server system according to the third embodiment. FIG. 11B is a diagram illustrating the "packet transmission path" after it is changed by the server system according to the third embodiment. The items illustrated in FIGS. 11A and 11B are the same as those explained with reference to FIGS. 5A and 5B and explanations therefor will be omitted.

Specifically, FIG. 11A indicates following. The packet having its destination at any of CPUs #1 to #4 or any of memory groups #1 to #4 of the system board 201 has the system board 201 as its destination and thus does not pass any of the crossbar boards. Alternatively, the packet that has CPU #1 of the system board 202 as its destination has the crossbar board 301 as its transmission path and the packet that has CPU #2 of the system board 202 as its destination has the crossbar board 303 as its transmission path. Similarly, the packet that has CPU #3 of the system board 202 as its destination has the crossbar board 305 as its transmission path and the packet that has CPU #4 of the system board 202 as its destination has the crossbar board 307 as its transmission path.

Alternatively, the packet that has memory group #1 of the system board 202 as its destination has the crossbar board 302 as its transmission path and the packet that has memory group #2 of the system board 202 as its destination has the crossbar board 304 as its transmission path. Similarly, the packet that has memory group #3 of the system board 202 as its destination has the crossbar board 306 as its transmission path and the packet that has memory group #4 of the system board 202 as its destination has the crossbar board 308 as its transmission path.

Alternatively, the packet that has CPU #1 of the system board 208 as its destination has the crossbar board 301 as its transmission path and the packet that has CPU #2 of the system board 208 as its destination has the crossbar board 303 as its transmission path. Similarly, the packet that has CPU #3 of the system board 208 as its destination has the crossbar board 305 as its transmission path and the packet that has CPU #4 of the system board 208 as its destination has the crossbar board 307 as its transmission path.

Similarly, the packet that has memory group #1 of the system board 208 as its destination has the crossbar board 302 as its transmission path and the packet that has memory group #2 of the system board 208 as its destination has the crossbar board 304 as its transmission path. Similarly, the packet that has memory group #3 of the system board 208 as its destination has the crossbar board 306 as its transmission path and the packet that has memory group #4 of the system board 208 as its destination has the crossbar board 308 as its transmission path. It is noted that FIG. 11A indicates that none of the transmission paths is changed.

The system boards 201 to 208, if they receive a suspension packet relative to the crossbar board 301 transmitted from the crossbar boards 301 to 308, change the "packet transmission path" illustrated in FIG. 11A to that illustrated in FIG. 11B.

For example, as illustrated in FIG. 11B, for the packet that has CPU #1 of the system board 202 as its destination, the "crossbar board 302" is stored in the "transmission path" and a "1" is stored in the "change". Additionally, for the packet that has CPU #1 of the system board 208 as its destination, the "crossbar board 308" is stored in the "transmission path" and a "1" is stored in the "change".

In addition, the following changes are made, though not illustrated in FIG. 11B. Specifically, for the packet that has CPU #1 of the system board 203 as its destination, the crossbar board 303 is set as its transmission path and, for the packet that has CPU #2 of the system board 204 as its destination, the crossbar board 304 is set as its transmission path. Additionally, for the packet that has CPU #1 of the system board 205 as its destination, the crossbar board 305 is set as its transmission path and, for the packet that has CPU #2 of the system board 206 as its destination, the crossbar board 306 is set as its transmission path. Similarly, for the packet that has CPU #1 of the system board 207 as its destination, the crossbar board 307 is set as its transmission path.

In this manner, the transmission path is changed from the crossbar board 301 for CPU #1 of each of the system boards 202 to 208, to thereby empty packets in the crossbar board 301 that is subjected to maintenance.

In addition, if there is any packet having its transmission path changed when the packet transmission to the crossbar board that has undergone the maintenance is resumed, the server system 100 according to the third embodiment changes the transmission path for the packet having its transmission path changed to the crossbar board that has undergone the maintenance. This process is the same as that in the second embodiment and explanations therefor will be omitted.

Effects Achieved by Third Embodiment

As described above, the server system 100 according to the third embodiment places the crossbar board 301 subjected to maintenance in a state of being disconnectable from the server system. This enables the dynamic maintenance of the crossbar board to be performed. Furthermore, in the third embodiment, when any one of the crossbar boards is subjected to dynamic maintenance, the transmission path for packets is not changed to a specific crossbar board, but is dispersed among a plurality of crossbar boards that are not subjected to maintenance. Specifically, the packet transmission can be prevented from being concentrated on a specific crossbar board. As a result, the server system 100 according to the third embodiment can perform the dynamic maintenance of the crossbar board, while transmitting packets without allowing the packets to stagnate.

[d] Fourth Embodiment

The server system disclosed in the present application may be embodied in many different forms, in addition to the embodiments described above. Thus, in a fourth embodiment, a server system disclosed in the present application according to another embodiment will be explained.

System Configuration and the Like

Of the processes explained in this embodiment, all or part of the processes that have been described to be performed automatically may be performed manually. Alternatively, all or part of the processes that have been described to be performed manually may be performed automatically by a well-known method. In addition, processing steps, control steps, and specific names described in text and drawings given above may be changed as desired unless otherwise specifically noted.

The elements illustrated above are only functionally conceptual and are not always physically configured as illustrated. For example, the suspension section 38b and the resumption section 38c included in the system board 3 may be integrated with each other. In addition, processing functions performed by the service processor, the system boards, and the crossbar boards included in the server system can be achieved, in all or in any given part thereof, by the CPU and a computer program analyzed and performed by the CPU. Alternatively, the processing functions performed by the service processor, the system boards, and the crossbar boards included in the server system can be achieved, in all or in any given part thereof, as hardware by wired logic.

The crossbar board can be subjected to dynamic maintenance during system operation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server system comprising:
a service processor;
a plurality of system boards; and
a plurality of crossbar boards connecting the system boards, wherein
the service processor comprises a first notifier that notifies each of the crossbar boards of a crossbar board subjected to maintenance,
the crossbar boards each comprise a first transmitter that, when notified by the service processor that the crossbar board subjected to maintenance is another crossbar board, generates a suspension packet for suspending packet transmission to the another crossbar board and transmits the suspension packet to each of the system boards, and
the system boards each comprise a suspender that, when receiving the suspension packet from the crossbar board, suspends packet transmission to the crossbar board subjected to maintenance.

2. The server system according to claim 1, wherein
the first notifier notifies, when maintenance of the crossbar board subjected to maintenance is completed, the crossbar board subjected to maintenance that the maintenance is completed,
the crossbar boards each further comprise a second transmitter that, when notified that the maintenance of own crossbar board is completed, generates a resumption packet for resuming packet transmission to the own crossbar board and transmits the resumption packet to all system boards connected to the own crossbar board, and
the system boards each further comprise a resumer that, when receiving the resumption packet, resumes packet transmission to the crossbar board for which the maintenance is completed.

3. The server system according to claim 2, wherein the resumer determines, when receiving the resumption packet, whether a packet having the transmission path changed exists and, when determining that the packet having the transmission path changed exists, changes the transmission path for the packet having the transmission path changed to the crossbar board for which the maintenance is completed and resumes transmission.

4. The server system according to claim 1, wherein the suspender changes, when receiving the suspension packet, a packet transmission path for the crossbar board subjected to maintenance to a crossbar board not subjected to maintenance and suspends packet transmission to the crossbar board subjected to maintenance.

5. The server system according to claim 1, wherein
the crossbar boards each further comprise:
   a determiner that monitors, when notice that the crossbar board subjected to maintenance is own crossbar board is received from the service processor, packets in the own crossbar board and determines whether all of the packets are transmitted; and
   a second notifier that notifies, when the determiner determines that all of the packets are transmitted, the service processor that no more packets exist in the own crossbar board.

6. The server system according to claim 1, wherein the first notifier notifies, when the second notifier notifies that no more packets exist in the crossbar board subjected to maintenance, that connections between the crossbar board subjected to maintenance and each of the system boards are to be disconnected.

7. The server system according to claim 6, wherein the first notifier notifies, when the maintenance of the crossbar board subjected to maintenance is completed, that the crossbar board for which the maintenance is completed and each of the system boards are to be reconnected.

8. A dynamic maintenance method for crossbar boards suitable for a server system that comprises a service processor; a plurality of system boards; and a plurality of crossbar boards connecting the system boards, the dynamic maintenance method comprising:
   notifying, by the service processor, each of the crossbar boards of a crossbar board subjected to maintenance;
   generating, by the crossbar boards, a suspension packet for suspending packet transmission to another crossbar board, when notice that the crossbar board subjected to maintenance is the another crossbar board is received from the service processor;
   transmitting, by the crossbar boards, the suspension packet to each of the system boards;
   monitoring, by the crossbar boards, packets in own crossbar board, when notice that the crossbar board subjected to maintenance is the own crossbar board is received from the service processor;
   determining, by the crossbar boards, whether all of the packets are transmitted;
   notifying, by the crossbar boards, the service processor that no more packets exist in the crossbar board subjected to maintenance, when all of the packets are determined to be transmitted; and
   suspending, by the system boards, packet transmission to the crossbar board subjected to maintenance, when the suspension packet is received from the crossbar boards.

* * * * *